Figure 3:
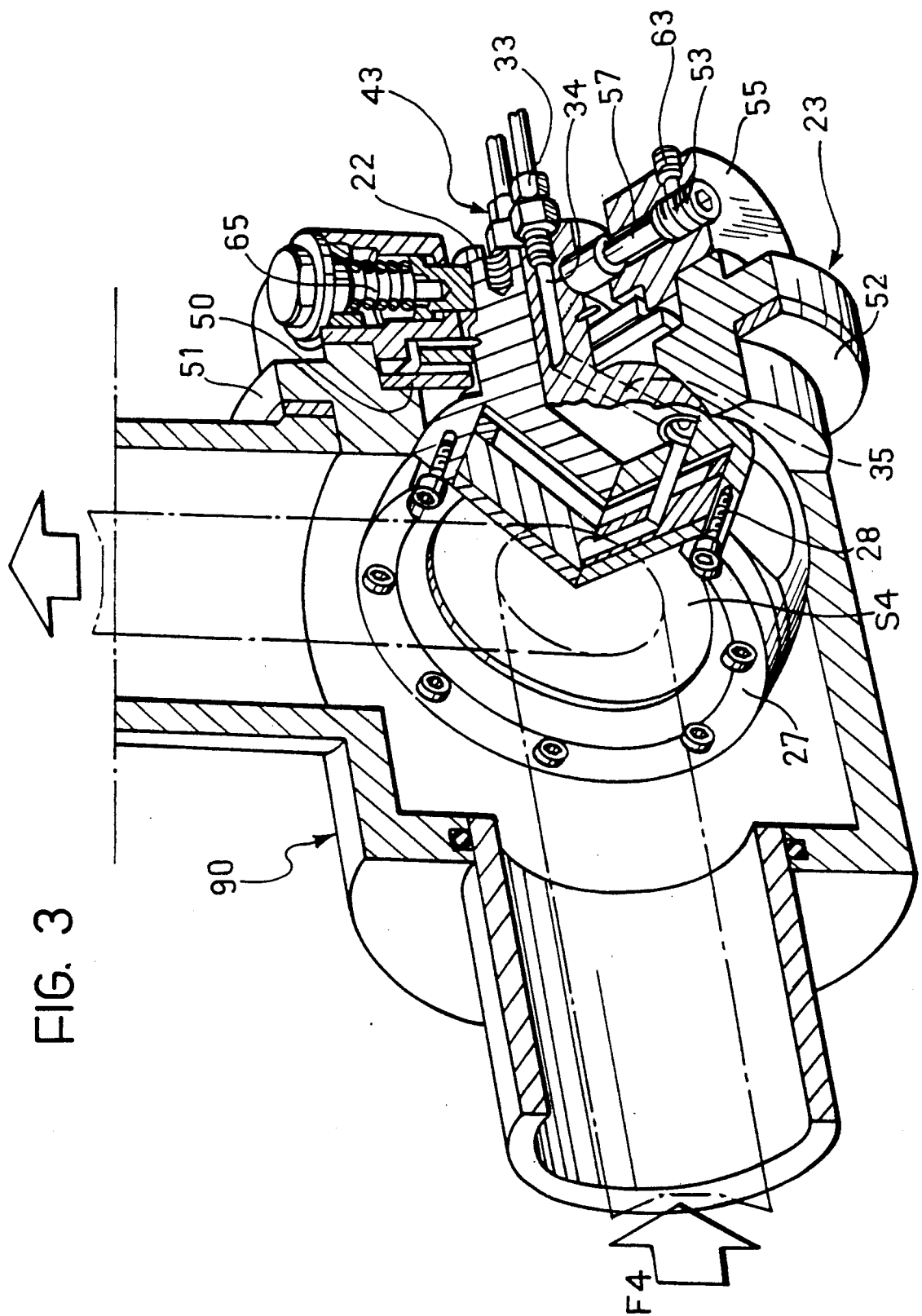

United States Patent [19]

Orsi et al.

[11] Patent Number: 5,099,102
[45] Date of Patent: Mar. 24, 1992

[54] DEVICE FOR SUPPORTING AND ADJUSTING A MIRROR IN A LASER-ROBOT SYSTEM AND A LASER-ROBOT SYSTEM USING THE DEVICE

[75] Inventors: Mario Orsi, Turin; Aldo Fiora, Plossasco, both of Italy

[73] Assignee: Comau S.p.A., Grugliasco, Italy

[21] Appl. No.: 649,443

[22] Filed: Feb. 1, 1991

[30] Foreign Application Priority Data

Feb. 9, 1990 [IT] Italy .................. 67100 A/90

[51] Int. Cl.⁵ .................................. B23K 26/06
[52] U.S. Cl. .................... 219/121.74; 219/121.78; 219/121.79
[58] Field of Search .......... 219/121.74, 121.78, . 219/121.79; 350/636, 634

[56] References Cited

U.S. PATENT DOCUMENTS 4,506,954  3/1985  Enomoto .................. 350/634
4,670,638  6/1987  Pavlin ..................... 219/121.78
4,910,378  3/1990  Arai ....................... 219/121.74

Primary Examiner—C. L. Albritton
Attorney, Agent, or Firm—Fish & Richardson

[57] ABSTRACT

A device for supporting and adjusting a mirror in a laser-robot system including a plurality of mirrors which reflect a laser beam in succession along a predetermined path to a head for emitting the laser beam includes a mirror-holder, a member which supports the mirror-holder for rotation about a center of rotation which lies on the reflecting surface of the mirror, and a mirror adjustment unit with first adjustment means for rotating the mirror holder about a first axis which passes through the center of rotation and second adjustment means for rotating the mirror-holder about a second axis which intersects the first axis perpendicularly at the center of rotation.

3 Claims, 8 Drawing Sheets

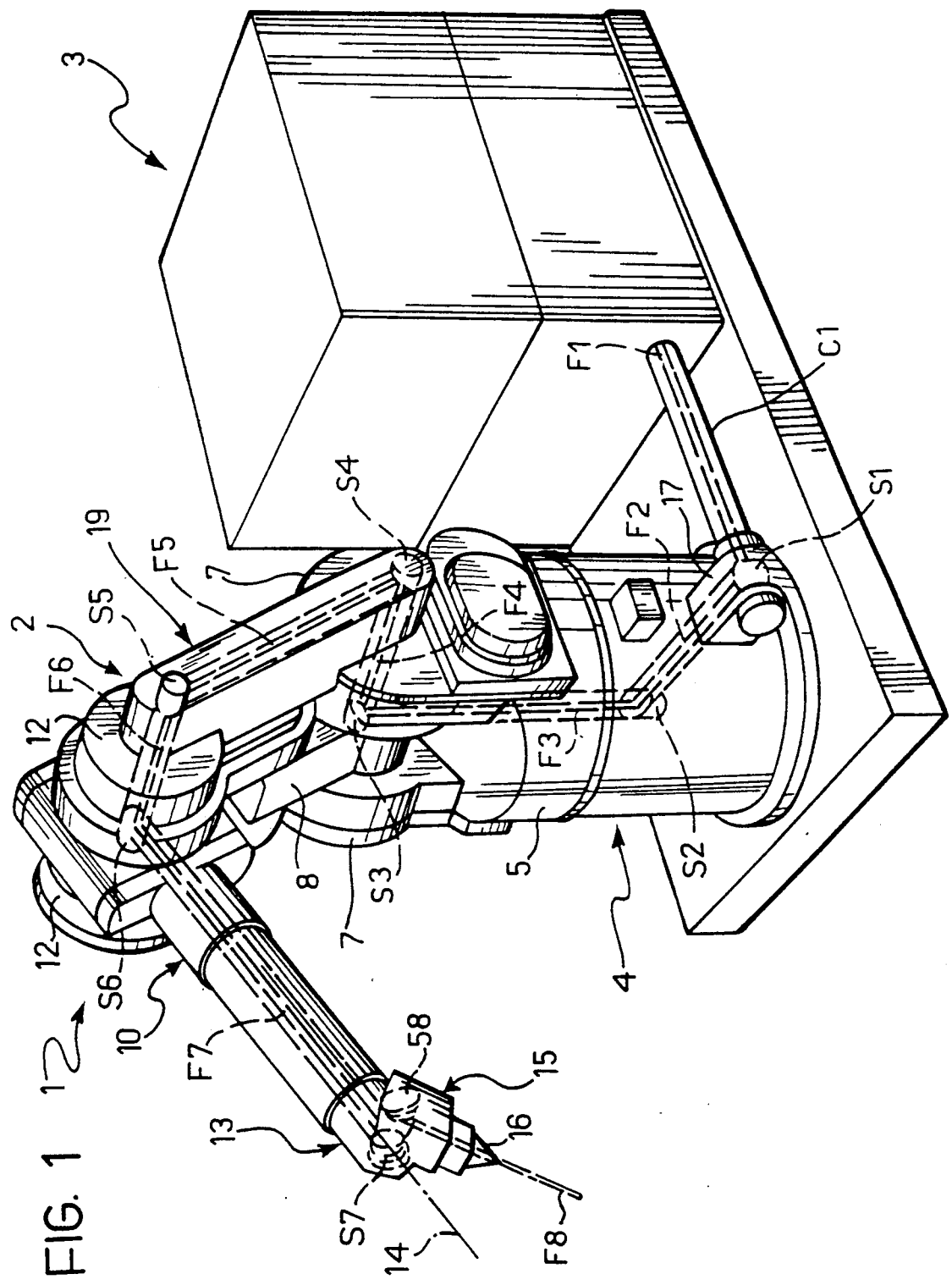

DEVICE FOR SUPPORTING AND ADJUSTING A MIRROR IN A LASER-ROBOT SYSTEM AND A LASER-ROBOT SYSTEM USING THE DEVICE

The present invention relates to a device for supporting and adjusting a mirror in a laser-robot system of the type including a plurality of mirrors which reflect a laser beam in succession along a predetermined path to a head which emits the laser beam. A laser-robot system of this type usable, for example, for welding, cutting or perforating operations is described in the present Applicant's Italian utility model IT-U-0 206 702 and in the corresponding U.S. Pat. No. 4,698,483.

Conventionally, a support and adjustment device is associated with each mirror of the laser robot for orienting the mirror precisely to ensure that the laser beam itself is directed in a predetermined direction. The laser robot produced by the Applicant in accordance with the document IT-U-0 206 702 uses a three-point adjustment device for each mirror. The disadvantage of this device is that each adjustment operation results in a complex movement of the mirror, corresponding to the sum of a rotation and a translation. This makes the orientation of the mirror a laborious and lengthy operation since, each time the device is adjusted to change the direction in which the beam is reflected by the mirror in a given plane, the direction of the beam is also changed in the plane perpendicular to the given plane.

The main object of the present invention is to provide an adjustment device which enables the mirror to be adjusted precisely to a predetermined orientation by quick and easy operations.

An additional object of the invention is to enable the device for supporting the mirror to be mounted precisely on the laser robot by quick and easy operations and also to allow the mirror on the support device to be replaced by quick and easy operations.

In order to achieve the aforesaid main object, the subject of the invention is a device for supporting and adjusting a mirror, characterised in that it comprises:
 a mirror,
 a mirror-holder,
 member which in turn supports the mirror-holder in a manner such that it can perform simple rotations in space about a centre of rotation which lies on the reflecting surface of the mirror,
 a mirror adjustment unit including first means for rotating the mirror-holder about a first axis which passes through the centre of rotation and second adjustment means for rotating the mirror-holder about a second axis which intersects the first axis perpendicularly at the centre of rotation.

By virtue of these characteristics, the device according to the invention enables the mirror to be arranged precisely in any desired orientation by quick and easy operations. Any movement of the mirror consists of a simple rotation about the said centre.

The adjustment operations are quick and easy since the first and second adjustment means can be operated in succession in order firstly to achieve a simple rotation about the first axis (without also translating the mirror or rotating it about the second axis) and secondly to achieve a simple rotation about the second axis. Since the two rotations are completely independent of each other, the final adjustment is precise and is achieved quickly and easily.

A further characteristic of the invention lies in the fact that the member which supports the mirror-holder has an annular flange which can be screwed to the structure of the robot with the interposition of one or more spacer discs which ensure that the centre of rotation coincides with a predetermined point within the robot at which the theoretical axis of the laser beam is to be reflected. The annular flange abuts a bearing surface of the robot structure with the interposition of the spacer ring. The distance between the plane of the bearing surface and the predetermined point within the robot at which the theoretical axis of the laser beam is to be reflected is known. Before the device is mounted on the mirror, one or more spacer rings of the type indicated above are positioned until it is confirmed, with the aid of measuring instruments, that the distance of the centre of rotation of the mirror-holder from the plane of the spacer ring which is intended to bear on the robot structure corresponds exactly to the known distance defined above. The device can thus be mounted on the robot quickly and easily since there is no need to check that the mirror is positioned correctly relative to the robot structure after it has been mounted.

Yet another important characteristic of the invention lies in the fact that the mirror-holder has a seat for the mirror with an annular, frontal abutment surface against which the reflecing surface of the mirror is urged resiliently, the centre of rotation being contained in the theoretical plane of the annular abutment surface. The mirror in the mirror-holder can thus be replaced quickly without the need to check that the reflecting surface of the mirror is arranged correctly in a plane containing the centre of rotation. In fact, once it is mounted, the mirror is urged resiliently against the abutment surface and that surface ensures that it is positioned correctly.

Figure 2:
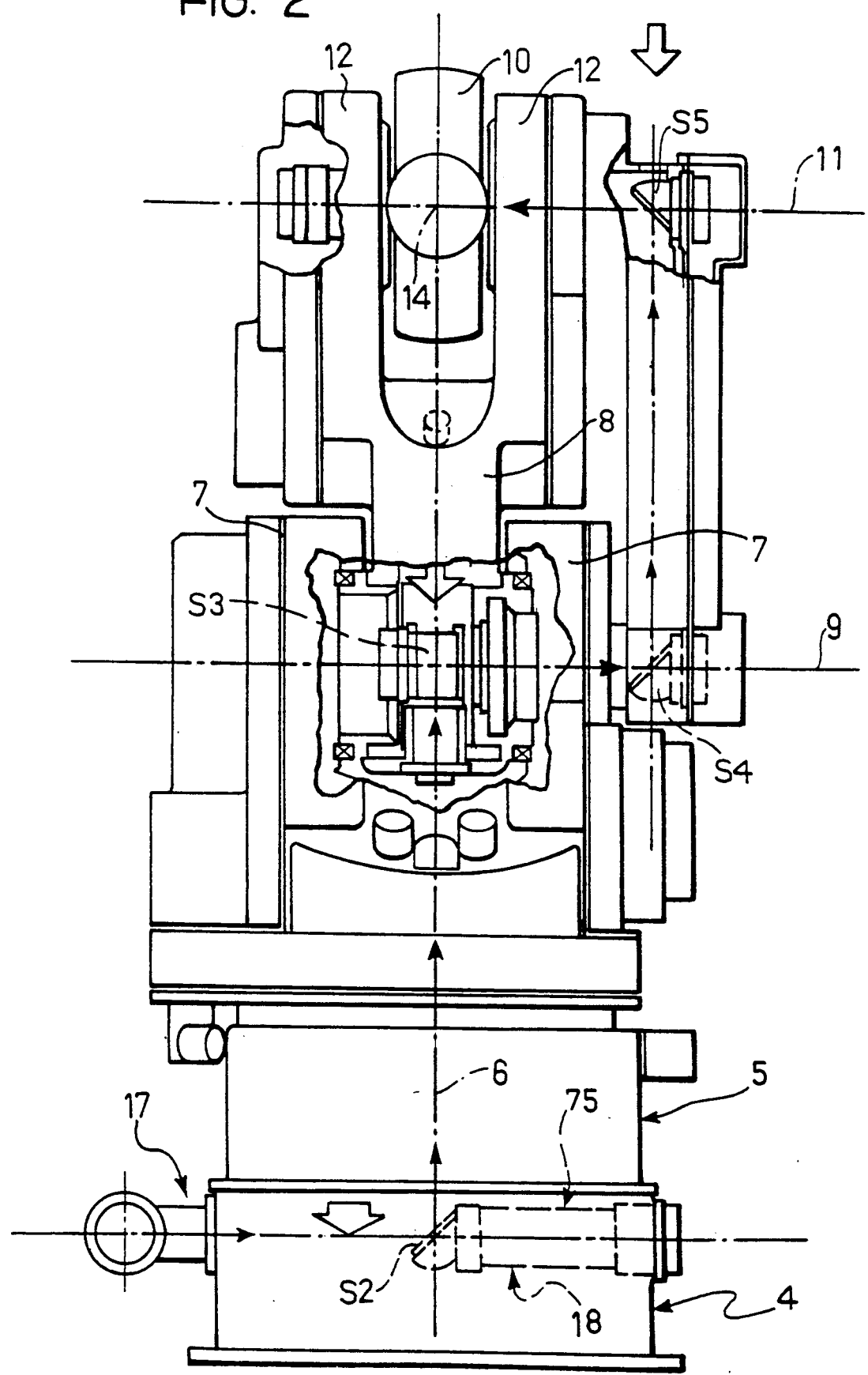
Figure 4:
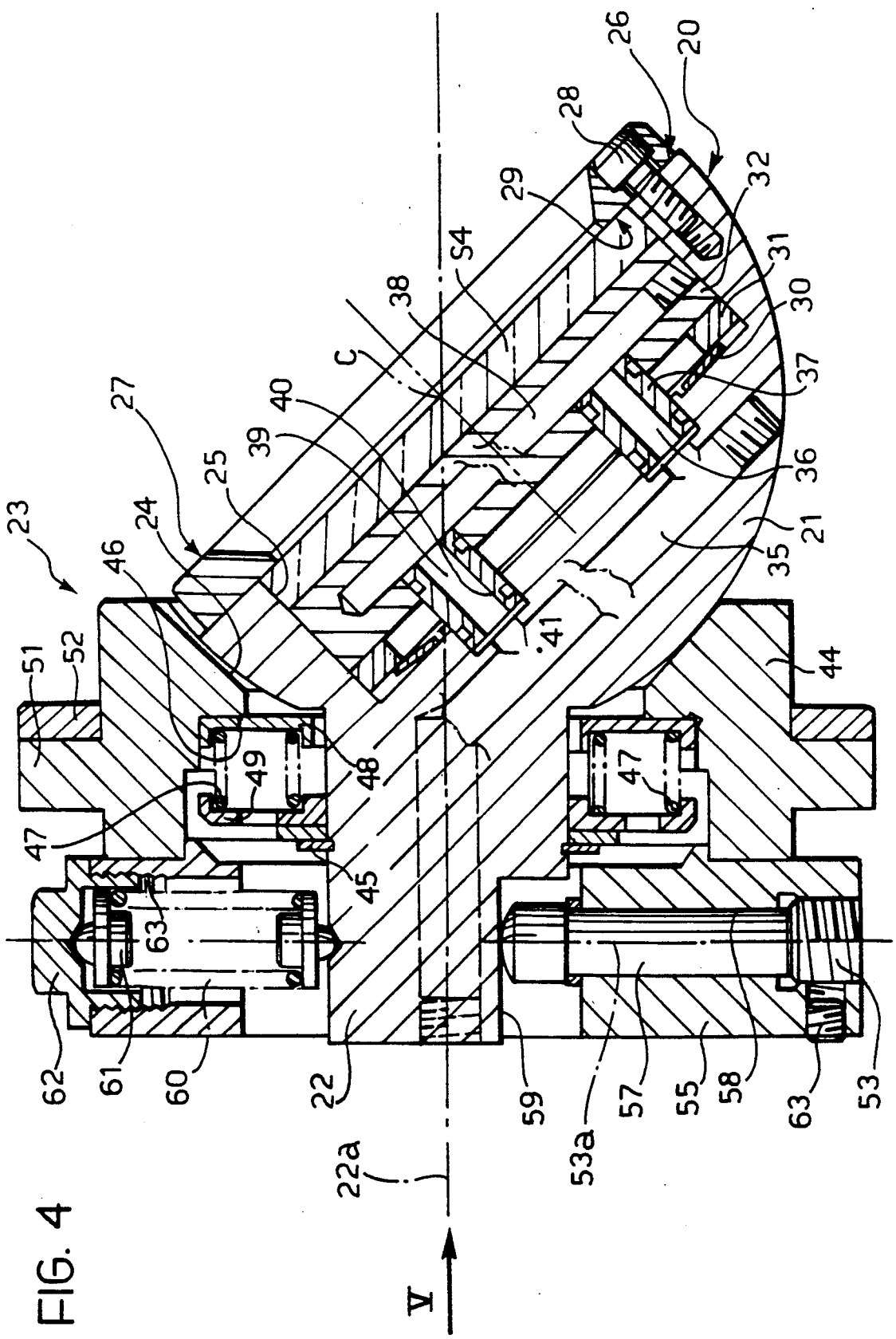
Figure 5:
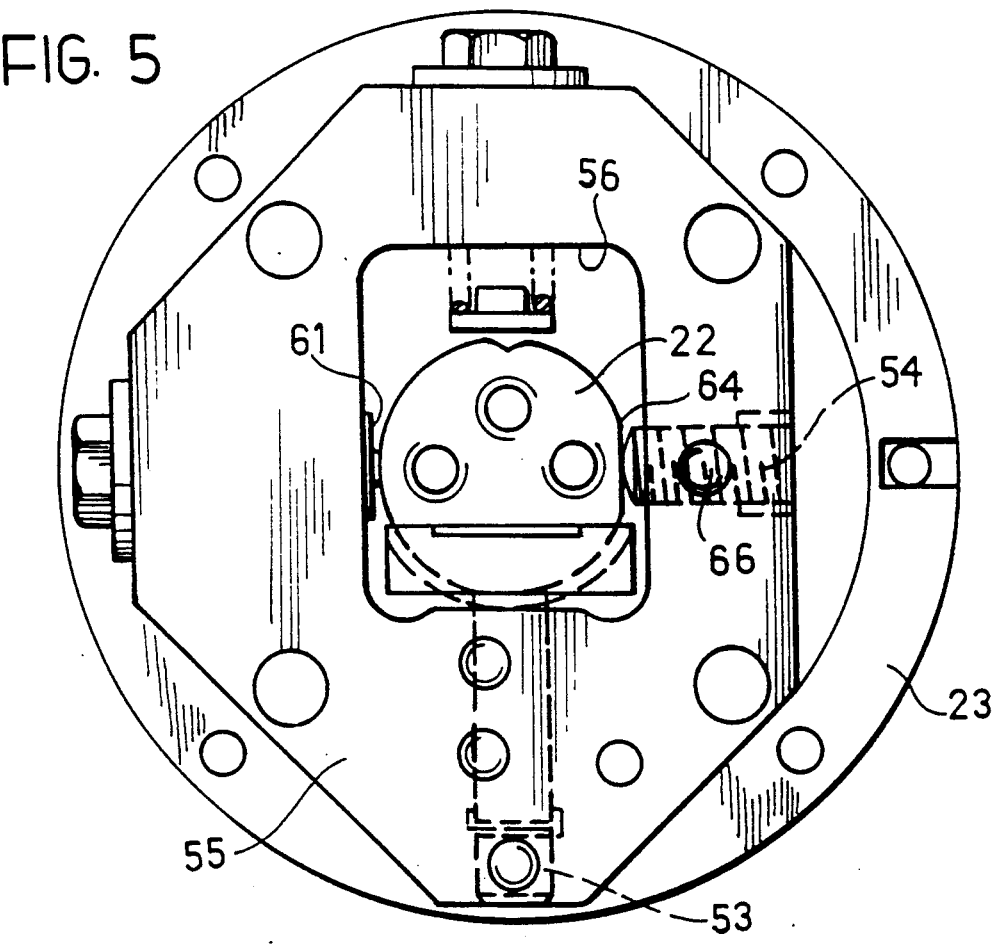
Figure 6:
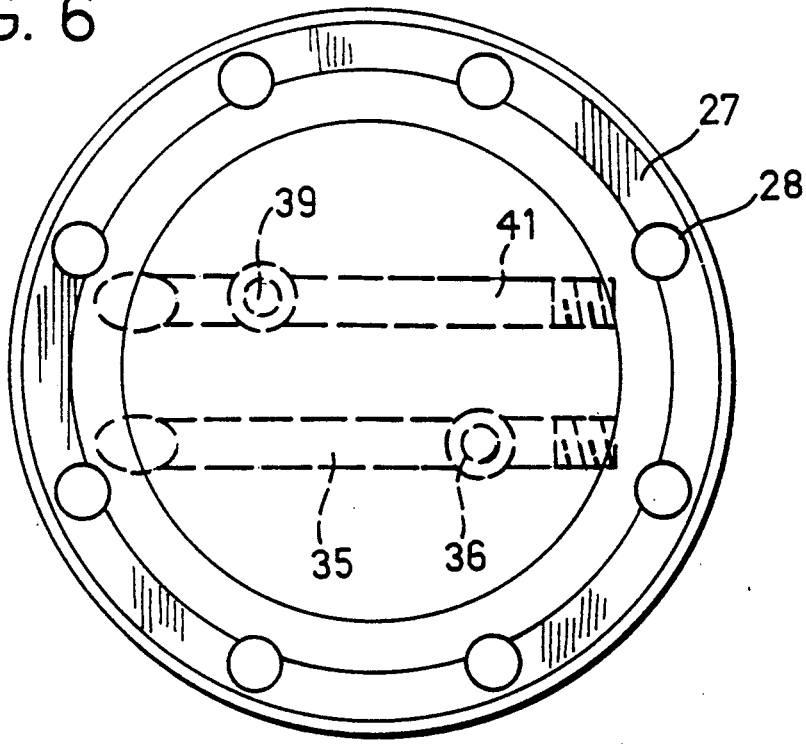
Figure 7:
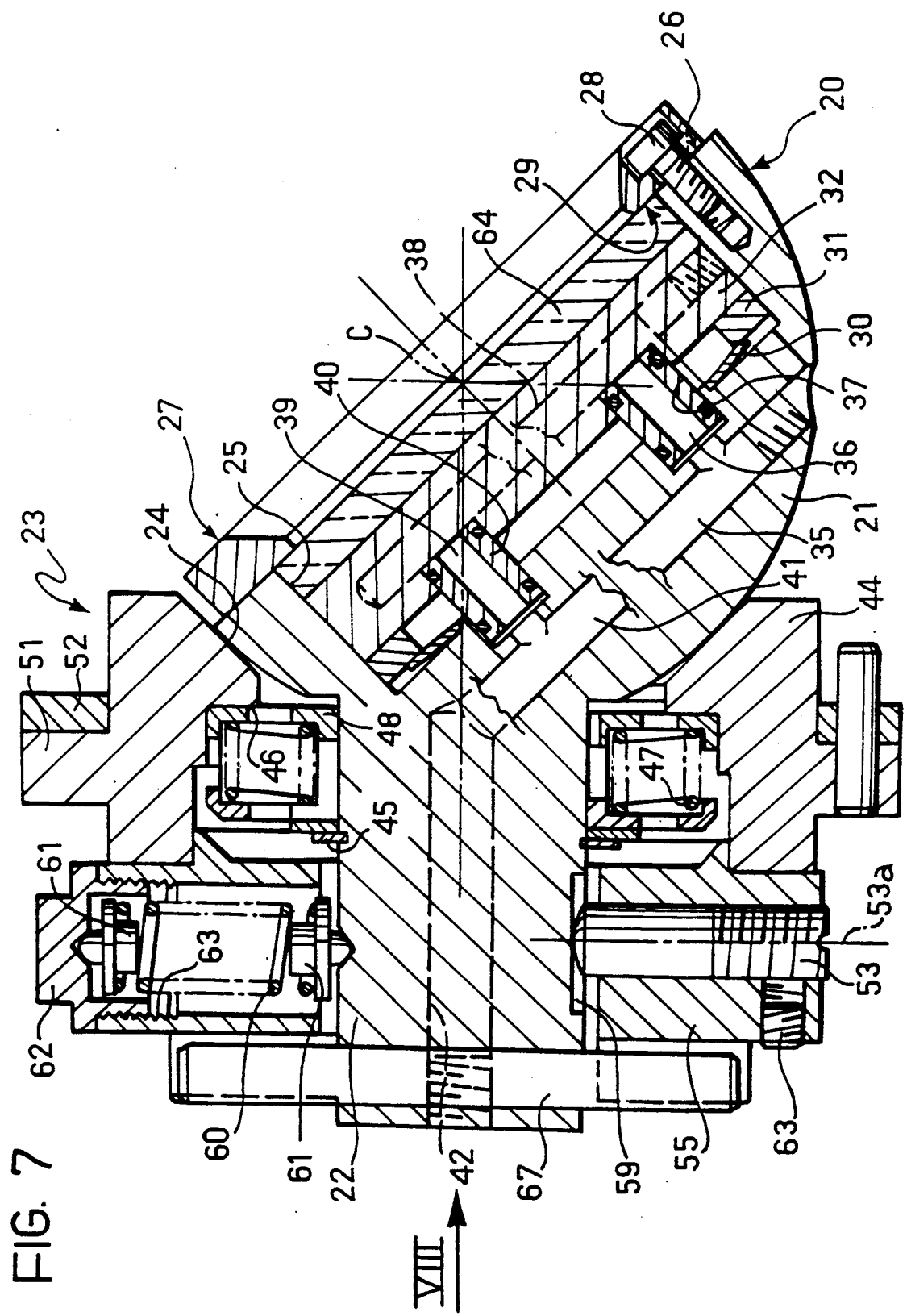
Figure 8:
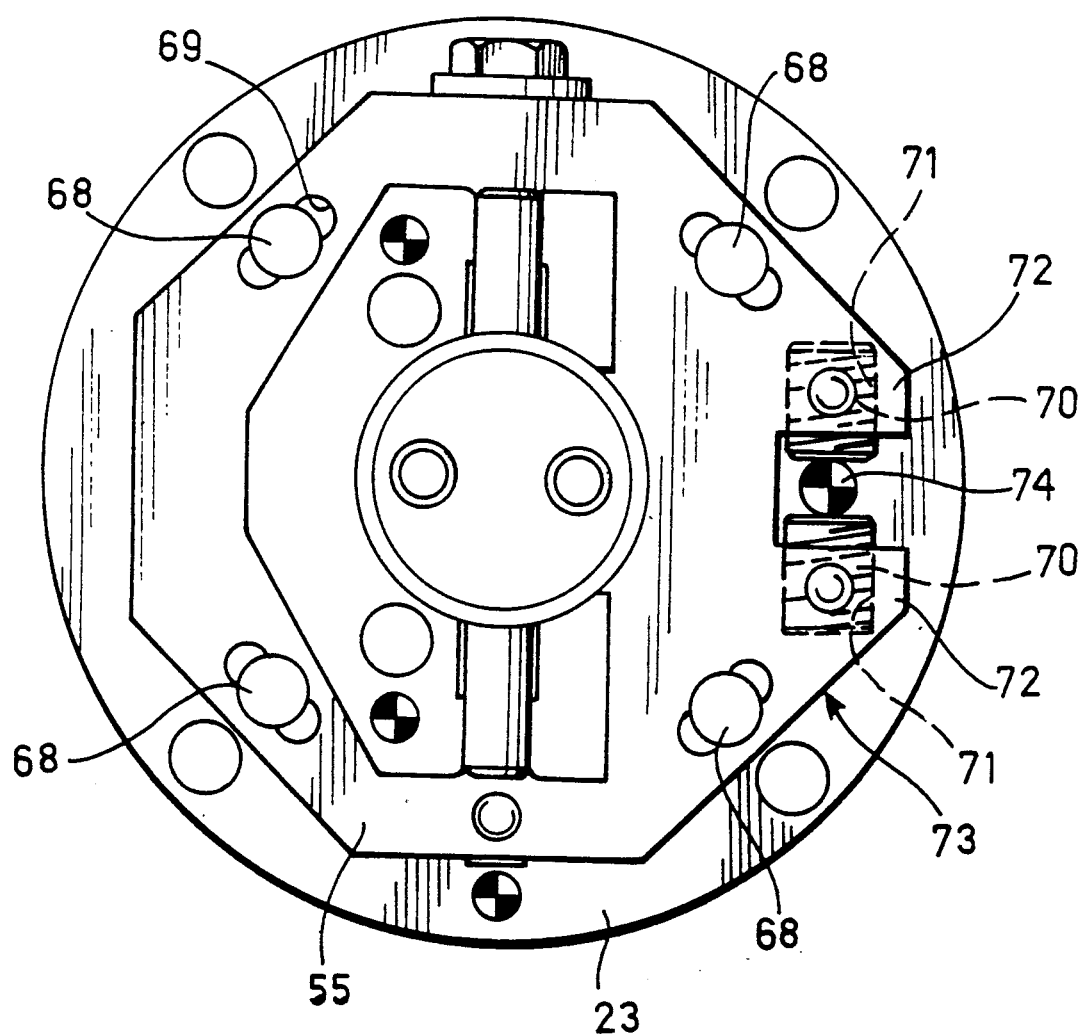
Figure 9:
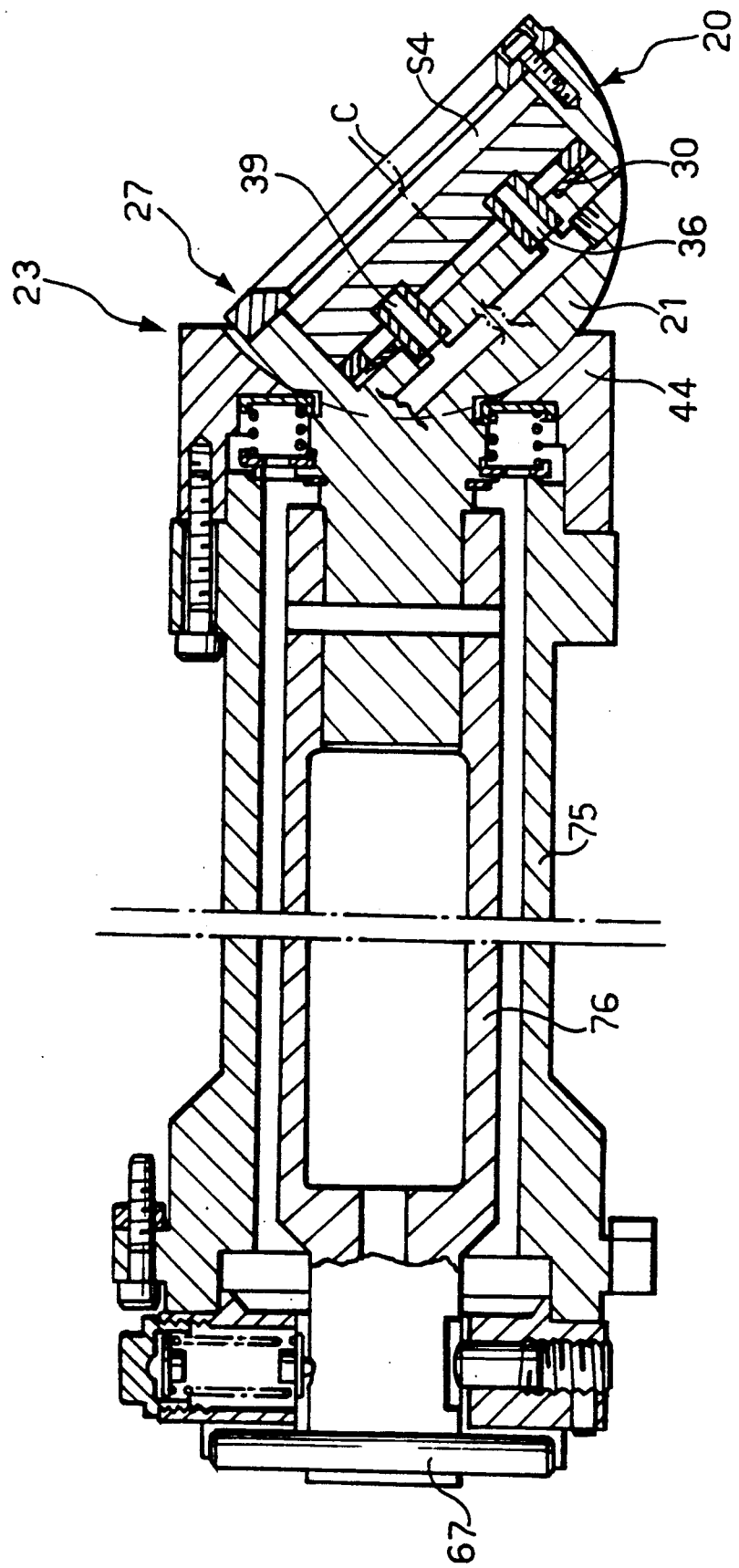

Further characteristics and advantages of the invention will become clear from the description which follows with reference to the appended drawings, provided purely by way of non-limiting example, in which:

FIG. 1 is a schematic perspective view of a laser robot with a plurality of adjustment devices according to the invention,
 FIG. 2 is a partially-sectioned elevational view of the laser robot of FIG. 1,
 FIG. 3 is a sectioned perspective view of the adjustment device according to the invention, on an enlarged scale,
 FIG. 4 is a sectional view of the adjustment device of FIG. 3,
 FIGS. 5 and 6 are views taken on the arrows V and VI of FIG. 4,
 FIG. 7 shows a variant of FIG. 4,
 FIG. 8 is a view taken on the arrow VIII of FIG. 7,
 FIG. 9 shows a further variant of FIG. 7.

In FIG. 1, a laser-robot system, generally indicated 1, includes a robot 2 and a source 3 for emitting a laser beam, the source being of any known type In the embodiment illustrated, the robot 2 includes a fixed base 4, a lower platform 5 rotatable on the base 4 about a vertical axis 6 (FIG. 2) and having two upwardly-extending parallel lugs 7, an arm 8 articulated to the two lugs 7 about a horizontal axis 9 (FIG. 2) and having two lugs 12 at its free end, and a forearm 10 articulated to the two lugs 12 about a further horizontal axis 11. An end part 13 mounted on the forearm 10 is rotatable relative to the forearm 10 about the longitudinal axis 14 thereof. The end part 13 has an orientable head 15 with a laser torch 16, that is, an optical system for focussing the laser beam, at its end.

The laser beam emitted by the source 3 is reflected successively to the emitter head 15 by a plurality of mirrors arranged along a predetermined path within the structure of the robot 2.

In the embodiment illustrated in FIGS. 1 and 2, the laser beam F1 emitted by the source 3 is shielded by a duct C1 which connects the structure of the source 3 to an elbow structure 17 associated with the base 4 of the robot. A mirror S1 is mounted in the elbow structure 17 and reflects the horizontal beam F1 to form a beam F2 which is also horizontal and whose axis intersects the axis of rotation 6 of the lower platform 5 of the robot. The beam F2 is reflected by a mirror S2 supported by a support 18 (FIG. 2) mounted in the base 4. The mirror S2 reflects the beam F2 to form a beam F3 whose axis coincides subtantially with the axis of rotation 6 of the lower platform 5 of the robot. The beam F3 is reflected by a mirror S3 carried by the arm 8 to form a beam F4 along the axis 9. The beam F4 is reflected by a mirror S4 disposed within a housing 19 associated with the arm 8 to form a beam F5 which intersects the axes 9 and 11 perpendicularly. The beam F5 is reflected by a mirror S5 also associated with the housing 19 to form a beam F6 whose axis coincides substantially with the axis 11. The beam F6 is reflected by a mirror S6 associated with the forearm 10 to form a beam F7 whose axis coincides with the axis 14. Finally, the orientable head 15 has a pair of mirrors S7 and S8 which reflect the laser beam F7 in succession to form the beam F8 which is emitted by the torch 16.

According to the invention, one or more of the mirrors S1–S8 has an adjustment device of the type which will be described below.

FIGS. 3–6 show, by way of example, the adjustment device associated with the mirror S4 which can be seen in FIGS. 1 and 2.

With reference to FIGS. 3–6, the mirror S4 is supported by a steel mirror-holder 20 including a hemispherical head 21 and a shank 22. The mirror-holder 20 is supported in turn by a support member 23, also of steel, with a seat 24 which slidably engages the outer surface of the hemispherical head 21 so that the mirror-holder 20 can rotate in space about a centre of rotation C representing the centre of the hemisherical head 21 and lying on the reflecting surface of the mirror S4 which, in the embodiment illustrated, is in the form of a regular circular disc. Naturally, the manner in which the mirror-holder 20 is supported by the member 23 may vary widely from that shown by way of example. Any other solution which allows the mirror S4 to rotate in space about a point C lying on the reflecting surface of the mirror may be used.

Still with reference to the embodiment shown in FIGS. 3–6 and particularly in FIG. 4, the mirror S4 is kept precisely in position within a cylindrical recess 25 in the head 21, the recess opening in the flat face 26 of the hemispherical head. The reflecting surface of the mirror is positioned precisely in the plane of the face 26 which contains the centre C of the hemispherical head 21 by a steel ring 27 fixed by a series of screws 28 to the face 26 of the head 21 and having an inner edge which projects into the recess 25 so as to define an annular abutment 29 coplanar with the face 26. The mirror S4 is urged against the abutment 29 by a Belleville washer 30 which bears on the base of the recess 25, a steel ring 31 and a steel plate 32, both with outside diameters corresponding substantially to the diameter of the recess 25, being interposed between the mirror S4 and the Belleville washer 30.

When the laser robot is in operation, the mirror S4 is cooled by a coolant which enters the mirror-holder 20 through a connector 33 (FIG. 3), an axial duct 34 in the shank 22, a duct 35 in the head 21, and a duct 36 (FIG. 4) defined by a bush 37 mounted in respective seats in the base of the recess 25 and in the plate 32 with the interposition of sealing rings. From the duct 36, the coolant follows a "Z"-shaped path 38 within the plate 32, after which it is discharged through a duct 39 defined by a bush 40 similar to the bush 37 described above, a duct 41 in the head 21 parallel to the duct 35, and a duct 42 in the shank 22 parallel to the duct 34, the coolant leaving the duct 42 through a connector 43 (FIG. 3).

The support member 23 has an annular body 44. Resilient means interposed between a resilient ring 45 mounted on the shank 22 and an annular abutment 46 on the inner surface of the body 41 hold the hemispherical head 21 against its seat 24. In the embodiment of FIG. 4, the resilient means are constituted by a circumferential series of helical springs 47 interposed between discs 48, 49 which bear on the abutment 46 and on the resilient ring 45 respectively. In the embodiment of FIG. 3, the resilient means are constituted by a flat spring 50.

The body 44 of the support member 23 has an outer annular flange 51 which is intended to be screwed to the robot structure. Spacers 52 such as the one shown in FIGS. 3 and 4 are interposed between the flange 51 and the robot structure to position the mirror-holder 20 precisely. More particularly, the support member 23, and hence the mirror-holder and the mirror S4, is positioned so that the centre of rotation C of the mirror (which, as seen above, lies on the reflecting surface of the mirror) coincides with the predetermined point within the robot structure at which the theoretical axis of the laser beam is to be reflected. In other words, once the position relative to the robot of the point at which the axis of the beam F4 is reflected onto the axis of the beam F5 has been determined, a spacer 52 is selected such that the centre C coincides with the predetermined point. Once the support member 23 has been mounted on the robot structure, the position of the mirror-holder 20 can be adjusted relative to the centre of rotation C to ensure that the axes of the beams F4 and F5 are oriented in the preselected manner. This is achieved by two adjustment screws 53 (FIGS. 3, 4) and 54 (FIG. 5) whose axes are perpendicular. More precisely, with reference to FIGS. 3, 4 and 5, the two screws 53, 54 are engaged in threaded holes in an element 55 fixed to the support member 23. The element 55 has a central hole 56 through which the shank 22 extends. The screw 53 acts on a pin 57 slidable in a radial hole 58 in the element 55 and having a head which engages a flat surface 59 on the shank 22. A helical spring 60 is mounted on the same axis as the pin 57, on the opposite side of the shank 22, between two disks 61 which bear against the shank 22 and against a closure element 62 screwed into a threaded hole 63 in the element 55, respectively. The spring 60 keeps the shank 22 against the head of the pin 57. The adjustment of the position of the screw 53 results in a change in the position of the pin 58 and hence of the shank 22. This rotates the mirror-holder 20 about the centre C in the plane containing the axis 22a, and the axis 53a, of the screw 53. Once the mirror-holder 20 is oriented as desired, the screw 53 can be locked in position by a radial grub screw 63.

The screw 54 (FIG. 5) acts directly against a flat surface 64 on the shank 22, a helical spring 65 (FIG. 3) similar to the spring 60 being arranged on the side of the shank 22 opposite the screw 54. The screw 54 is also locked in the desired position by a radial grub screw 66.

Once the support member 23 has been fixed to an element 90 (FIG. 3) forming part of the robot structure, the spacer 52 being positioned so as to ensure that the centre C coincides with the theoretical reflection point of the laser beam, the two screws 53 and 54 are adjusted to ensure that the reflected beam F5 is directed along the desired axis.

FIGS. 7 and 8 show a variant of the solution shown in FIGS. 3-6. In FIGS. 7 and 8, parts the same as those illustrated in FIGS. 3-6 are indicated by the same reference numerals. The difference between the solution, illustrated in FIGS. 7 and 8 and that described above lies in the way in which the orientation of the mirror S4 is adjusted. The embodiment of FIGS. 7 and 8 also has an adjustment screw 53. It does not, on the other hand, have an adjustment screw 54. The shank 22 is, however, connected by a transverse pin 67 for rotation with the element 55 which can rotate relative to the support member 23 about the axis 22a and is guided by the engagement of four screws 68 engaged in corresponding arcuate slots 69. The angular position of the element 55 about the axis 22a can be adjusted by two screws 70 screwed into threaded holes 71 in two arms 72 of a fork portion 73 of the element 55. The facing ends of the screws 70 act against an axial pin 74 fixed to the support member 23. The angular position of the shank 22 about the axis 22a can thus be adjusted by the adjustment of the screws 70. In combination with the adjustment achieved by the screw 53 (FIG. 7), this adjustment enables the mirror to be oriented in any desired manner.

FIG. 9 shows a variant of the solution shown in FIGS. 7 and 8, which differs therefrom solely in that it has a tube 75 forming an extension of the support member 23 and a tube 76 forming an extension of the shank 22. This solution is suitable for positioning the mirror S2 (FIG. 2) so that it can be oriented remotely.

Naturally, the principle of the invention remaining the same, the details of construction and forms of embodiment may be varied widely with respect to those described and illustrated purely by way of example, without thereby departing from the scope of the present invention.

What is claimed is:

1. A device for supporting and adjusting a mirror in a laser-robot system including a plurality of mirrors which reflect a laser beam in succession along a predetermined path to a head which emits the laser beam, wherein the device includes:
    a mirror;
    a mirror-holder having a hemispherical head;
    a member which supports the mirror-holder in a manner such that it can rotate in space about a centre of rotation which lies on the reflecting surface of the mirror, the support member having a seat corresponding to the hemispherical head of the mirror-holder in which the hemispherical head is supported slidably, the centre of the hemispherical head being in the plane of the reflecting surface of the mirror; and
    a mirror adjustment unit including first adjustment means for rotating the mirror-holder about a first axis which passes through the said centre of rotation and second adjustment means for rotating the mirror-holder about a second axis which intersects the first axis perpendicularly at the centre of rotation;
    the head of the mirror-holder having a shank and the first and second means for adjusting the mirror including two adjustment screws movable relative to the support member and arranged on two perpendicular axes intersecting the axis of the shank for rotating the mirror-holder about the first and second axes respectively.

2. A device for supporting and adjusting a mirror in a laser-robot system including a plurality of mirrors which reflect a laser beam in succession along a predetermined path to a head which emits the laser beam, wherein the device includes:
    a mirror;
    a mirror-holder having a hemispherical head;
    a member which supports the mirror-holder in a manner such that it can rotate in space about a centre of rotation which lies on the reflecting surface of the mirror, the support member having a seat corresponding to the hemispherical head of the mirror-holder in which the hemispherical head is supported slidably, the centre of the hemispherical head being in the plane of the reflecting surface of the mirror; and
    a mirror adjustment unit including first adjustment means for rotating the mirror-holder about a first axis which passes through the said centre of rotation and second adjustment means for rotating the mirror-holder about a second axis which intersects the first axis perpendicularly at the centre of rotation,
    the hemispherical head of the mirror-holder having a shank, the first means for adjusting the position of the mirror-holder including an adjustment screw movable relative to the support member and arranged on an axis perpendicular to the axis of the shank, and the second adjustment means being adapted to rotate the mirror-holder about the axis of the shank.

3. A device for supporting and adjusting a mirror in a laser-robot system including a plurality of mirrors which reflect a laser beam in succession along a predetermined path to a head which emits the laser beam, wherein the device includes:
    a mirror;
    a mirror-holder having a hemispherical head;
    a member which supports the mirror-holder in a manner such that it can rotate in space about a centre of rotation which lies on the reflecting surface of the mirror, the support member having a seat corresponding to the hemispherical head of the mirror-holder in which the hemispherical head is supported slidably, the centre of the hemispherical head being in the plane of the reflecting surface of the mirror; and
    a mirror adjustment unit including first adjustment means for rotating the mirror-holder about a first axis which passes through the said centre of rotation and second adjustment means for rotating the mirror-holder about a second axis which intersects the first axis perpendicularly at the centre of rotation,
    the hemispherical head of the mirror-holder having a shank, the first means for adjusting the position of the mirror-holder including an adjustment screw movable relative to the support member and arranged on an axis perpendicular to the axis of the shank, and the second adjustment means being adapted to rotate the mirror-holder about the axis of the shank, the second adjustment means further including an intermediate element connected for rotation with the shank and rotatable on the support member about the axis of the shank, screw means being interposed between the intermediate element and the support member for rotating the mirror-holder about the axis of the shank.

* * * * *

UNITED STATES PATENT AND TRADEMARK OFFICE
CERTIFICATE OF CORRECTION

PATENT NO. : 5,099,102
DATED : March 24, 1992
INVENTOR(S) : Orsi et al.

It is certified that error appears in the above-identified patent and that said Letters Patent is hereby corrected as shown below:

On the Title page, item [75] Inventors, "Turin" should be --Turino--.

Col. 1, line 44, before "member" insert --a--.

Col. 2, line 58, after "type" insert a period --.--

Signed and Sealed this

Tenth Day of August, 1993

Attest:

MICHAEL K. KIRK

Attesting Officer

Acting Commissioner of Patents and Trademarks